(12) United States Patent
Lescure et al.

(10) Patent No.: US 7,736,083 B2
(45) Date of Patent: Jun. 15, 2010

(54) DEVICE FOR CONNECTING TWO ROTATING SHAFTS, IN PARTICULAR IN A TURBOMACHINE

(75) Inventors: Xavier Firmin Camille Jean Lescure, Boulogne Billancourt (FR); Lucien Paul Pham, Le Mee sur Seine (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/945,533

(22) Filed: Nov. 27, 2007

(65) Prior Publication Data

US 2008/0124168 A1 May 29, 2008

(30) Foreign Application Priority Data

Nov. 28, 2006 (FR) ................... 06 10381

(51) Int. Cl.
*F03D 11/00* (2006.01)
(52) U.S. Cl. ............. 403/359.1; 403/359.6; 416/244 A; 464/78
(58) Field of Classification Search ... 403/359.1–359.6; 415/216.1; 416/244 R, 244 A; 464/78, 86
See application file for complete search history.

(56) References Cited

U.S. PATENT DOCUMENTS

| | | | |
|---|---|---|---|
| 2,888,258 A * | 5/1959 | Nilsson | 267/181 |
| 3,602,535 A | 8/1971 | Behning et al. | |
| 4,292,001 A | 9/1981 | Snell | |
| 5,282,358 A | 2/1994 | Schilling | |
| 5,533,825 A * | 7/1996 | Stone | 403/359.6 |
| 5,580,183 A * | 12/1996 | Brackoneski et al. | 403/359.1 |
| 5,640,884 A * | 6/1997 | Fujiu et al. | 74/492 |
| 5,658,087 A * | 8/1997 | Butkovich et al. | 403/359.5 |
| 5,791,686 A * | 8/1998 | Moriyama | 280/777 |
| 6,026,704 A * | 2/2000 | Shibata et al. | 74/496 |
| 6,142,033 A | 11/2000 | Beigang | |
| 6,428,236 B2 * | 8/2002 | Aota et al. | 403/359.5 |
| 6,827,548 B2 * | 12/2004 | Coxhead et al. | 415/9 |
| 2008/0069636 A1 * | 3/2008 | Saito et al. | 403/359.1 |

* cited by examiner

*Primary Examiner*—Daniel P Stodola
*Assistant Examiner*—Joshua T Kennedy
(74) *Attorney, Agent, or Firm*—Oblon, Spivak, McClelland, Maier & Neustadt, L.L.P.

(57) ABSTRACT

Device for connecting two rotating shafts (10, 12), one driving and the other driven, comprising rectilinear splines (20) formed on the driving shaft (10) and engaged in complementary rectilinear splines (22) of the driven shaft (12), the splined region of the driven shaft having, in the vicinity of one of its longitudinal ends, at least one cylindrical portion (26) having a greater torsional flexibility.

14 Claims, 2 Drawing Sheets

DEVICE FOR CONNECTING TWO ROTATING SHAFTS, IN PARTICULAR IN A TURBOMACHINE

BACKGROUND OF THE INVENTION AND DESCRIPTION OF THE PRIOR ART

The present invention relates to a device for connecting two rotating shafts, in particular in a turbomachine, between a turbine shaft and a compressor shaft of the turbomachine.

In a turbomachine such as an aircraft turbofan or turboprop, the shaft of the low-pressure turbine rotationally drives the shaft of the low-pressure compressor, these two shafts being rotationally connected by a system of rectilinear splines which are formed, for example, on the outer cylindrical surface of the turbine shaft and which are engaged in complementary rectilinear splines of an inner cylindrical surface of the compressor shaft.

In operation, the splines of the two shafts are elastically deformed in torsion, and it is found that the stresses are maximum at the longitudinal ends of the splines of the male shaft, which is the turbine shaft, this concentration of stresses limiting the service life of this shaft.

SUMMARY OF THE INVENTION

The object of the invention is in particular to provide a simple, effective and economic solution to this problem.

The invention accordingly provides a device for connecting two rotating shafts, one driving and the other driven, one end of the driving shaft having rectilinear splines and being engaged in a female portion of the driven shaft having rectilinear splines complementing those of the driving shaft, wherein the splined region of the driven shaft comprises at least one cylindrical portion which has a greater torsional flexibility and is situated in the vicinity of a longitudinal end of the splined region.

In this connection device, the greater torsional flexibility of that portion of the driven shaft which is close to one end of the splines of the driving shaft makes it possible to reduce the maximum stresses applied to this end in operation, it being possible for this reduction to be around 30% and to significantly increase the life of the driving shaft.

According to another feature of the invention, the or each torsionally more flexible cylindrical portion of the driven shaft (and/or the corresponding portion of the driving shaft) is devoid of splines.

The driven shaft (and/or the driving shaft) thus has two splined portions separated longitudinally from one another by a torsionally more flexible portion, thus making it possible to reduce the stresses applied to the splines of one splined end portion of this shaft while increasing the stresses applied to the ends of the splines of the other splined portion of this shaft.

In other words, when the driving and driven shafts each have two splined portions separated longitudinally, the maximum stresses are distributed over the ends of the splined portions and are less pronounced than in the case where the shafts have a single splined portion.

In one embodiment of the invention, the splined region of the driven shaft comprises at least two cylindrical portions having a greater torsional flexibility, these two cylindrical portions being separated from one another.

When the shafts each comprise three splined portions separated longitudinally, the maximum stresses applied to the splines in operation are distributed over the ends of the three splined portions and are even less pronounced.

In a variant, the or each torsionally more flexible portion of the driven shaft and/or the corresponding portion of the driving shaft are machined in order to eliminate any contact between them upon the transmission of a torque.

The torsional flexibility of the driven shaft can be increased, in the or each aforementioned cylindrical portion, by reducing its thickness and/or its diameter, and/or by machining, for example by drilling.

The length of the or of each more flexible cylindrical portion is approximately 15 to 30% of the total length of that portion of the driven shaft having the splines.

The invention also relates to a turbomachine, such as an aircraft turbofan or turboprop, comprising a compressor whose shaft is driven rotationally by a turbine shaft, wherein the shaft of the compressor and the turbine shaft are connected by a device as described above.

The aforementioned more flexible cylindrical portions of the driven and driving shafts may be in the vicinity of the upstream and downstream ends of the splined regions of the shafts.

BRIEF DESCRIPTION OF THE DRAWINGS

The invention will be better understood and other features, details and advantages of the invention will become apparent on reading the description below given by way of nonlimiting example with reference to the appended drawings, in which.

DESCRIPTION OF THE PREFERRED EMBODIMENTS

Figure 1:
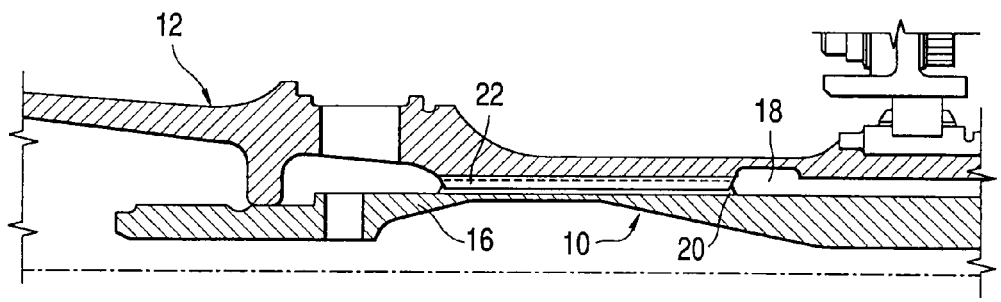
FIG. 1 is a schematic half-view in axial section of a connection device according to the prior art, between a turbine shaft and a compressor shaft of a turbomachine.

FIG. 1 is a highly schematic representation of a shaft 10 of a low-pressure turbine and a shaft 12 of a low-pressure compressor of a turbomachine such as an aircraft turbofan or turboprop, the turbine shaft 10 driving the shaft 12 of the compressor about the longitudinal axis 14 of the turbomachine by means of a prior art connection device which uses splines to produce the connection.

The upstream end 16 of the turbine shaft 10 forms a male cylindrical portion which is engaged in a female cylindrical passage 18 of the shaft 12 of the compressor and which has, on an outer cylindrical surface, a plurality of rectilinear splines 20 of substantially rectangular or trapezoidal cross section, these splines being uniformly distributed around the axis 14 and cooperating with corresponding rectilinear splines 22 of an inner cylindrical surface of the passage 18 of the shaft 12.

The turbine shaft 10 is driven rotationally about the axis 14 by means of the energy supplied by the hot gases leaving the combustion chamber of the turbomachine, these hot gases driving the rotors of the low-pressure turbine which are fastened to the downstream end of the turbine shaft 10. This shaft 10 in turns transmits, by way of the splines 20, 22, a torque to the shaft 12 of the compressor which bears the fan of the turbomachine at its upstream end.

During the transmission of a torque, the splines 20, 22 of the shafts 10, 12 are elastically deformed in torsion about the axis 14, thus generating considerable stresses at the longitudinal ends of the splines 20 of the turbine shaft 10, in particular at their downstream longitudinal ends, and resulting in a reduction in the service life of this shaft 10.

The invention makes it possible to overcome this problem by means of calibrating the torsional flexibility of at least one portion of the splined region of the shaft 12 of the compressor, this portion being situated in the vicinity of the downstream end of the splined region of the shaft 10.

Figure 2:
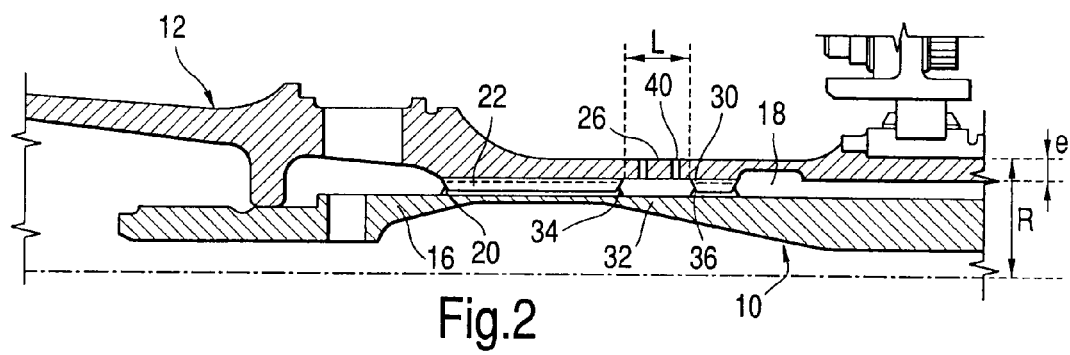
FIG. 2 is a schematic half-view in axial section of a connection device according to the invention, between a turbine shaft and a compressor shaft of a turbomachine.
Figure 3:
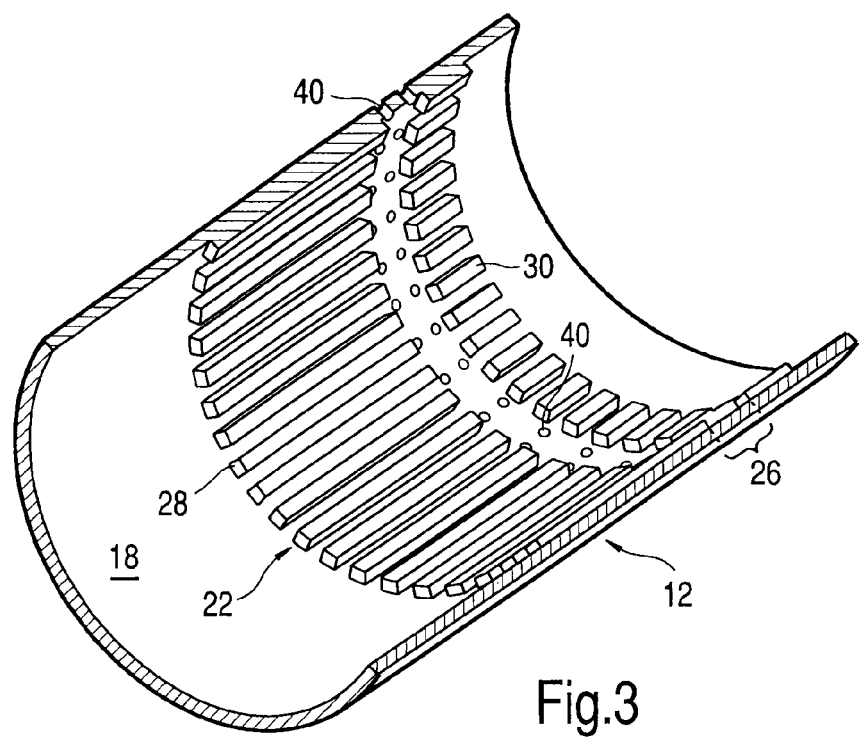
FIG. 3 is a schematic view in axial section of the compressor shaft shown in FIG. 2, on a larger scale.

In the example represented in FIGS. 2 and 3, the splined regions of the two shafts have substantially the same length and the splined region of the shaft 12 of the compressor comprises a cylindrical portion 26 devoid of splines that is situated close to the downstream end of the splined region of the shaft 12 and that has a greater torsional flexibility than the remainder of this splined region. In this way, the downstream end portion of the splined region of the shaft 12 is less resistant to the torsional loads applied by the splined region of the shaft 10, thus limiting the stresses generated in the downstream end portion of the splines of the shaft 10, thereby increasing the service life of this shaft.

The cylindrical portion 26 of the shaft 12 (defined by dashed lines) is situated between two independent splined portions, an upstream splined portion 28 and a downstream splined portion 30.

The portion 32 of the turbine shaft, aligned radially with the portion 26 of the shaft 12, is likewise devoid of splines 22 and is located between two independent splined portions, an upstream splined portion 34 and a downstream splined portion 36.

The torsional flexibility of the portion 26 of the shaft 12 has the effect of distributing the stresses in operation over the upstream and downstream longitudinal ends of the two splined portions 34 and 36 of the shaft 10. The maximum stresses experienced by the splines are thus less pronounced than in the case where the shafts have a single splined portion.

The torsional flexibility of the portion 26 of the shaft 12 is calibrated by varying its thickness e, its outer radius R and/or its axial dimension L. The smaller the thickness e or the radius R of this portion 26, the greater its torsional flexibility. The torsional flexibility of the shaft can likewise be increased by machining the cylindrical portion 26 of the shaft 12.

Figure 4:
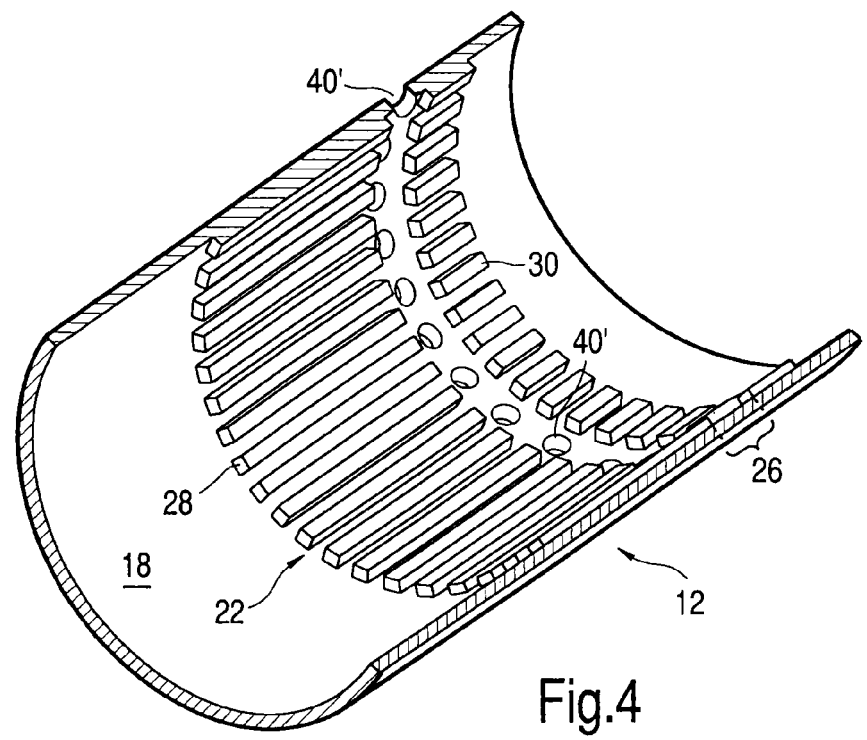
FIG. 4 is a schematic view corresponding to FIG. 3 and illustrating a variant embodiment of the invention.

In the example represented in FIG. 3, the portion 26 of the shaft 12 has two annular rows of radial drilled holes 40, which are uniformly distributed about the axis 14 of the turbomachine. FIG. 4 shows a variant embodiment of the invention in which the portion 26 of the shaft 12 has a single annular row of radial drilled holes 40', these drilled holes 40' having a diameter which is greater than that of the drilled holes 40 shown in FIG. 3. The number, the arrangement and the dimensions of these drilled holes 40, 40' are determined in such a way that the flexibility of this portion 26 can be calibrated with precision.

The cylindrical portion 26 of the shaft here has a length of approximately 30 mm, and the upstream and downstream splined portions have lengths of approximately 100 mm and 10 mm, respectively.

In yet another variant (not shown), the portion 26 of the shaft 12 having greater flexibility and the corresponding cylindrical portion 32 of the shaft 10 comprise splines, at least some of these splines being machined in order to eliminate any contact between them upon the transmission of a torque. This torque is transmitted solely by way of the splines 20, 22 situated on either side of the cylindrical portions 26 and 32. The splines 20, 22 of the shafts can have a square, rectangular or trapezoidal cross section.

The splined region of the shaft 12 of the compressor can have two cylindrical portions 26 of greater flexibility, or even more, these portions being separated from one another and being able to be provided in the vicinity of the upstream and downstream ends of the splined region of the shaft 12.

The invention claimed is:

1. A turbomachine comprising two rotating shafts, wherein one of said two rotating shafts is a driving shaft and the other of said two rotating shafts is a driven shaft configured to be driven by said driving shaft, wherein the driving shaft has rectilinear splines engaged in a driven spline portion of the driven shaft having rectilinear splines complementing the rectilinear splines of the driving shaft, wherein the driven shaft comprises at least one cylindrical portion devoid of splines located within the driven splined portion, and wherein said cylindrical portion has a torsional flexibility that is greater than a torsional flexibility of said driven spline portion.

2. The turbomachine as claimed in claim 1, wherein the driving shaft, has a cylindrical portion corresponding to the cylindrical portion of the driven shaft, wherein said cylindrical portion of the driving shaft is devoid of splines.

3. The turbomachine as claimed in claim 2, wherein the cylindrical portions of the driven and driving shafts are in the vicinity of downstream ends of the splines of the shafts.

4. The turbomachine as claimed in claim 2, wherein the cylindrical portions of the driven and driving shafts are in the vicinity of upstream ends of the splines of the shafts.

5. The turbomachine as claimed in claim 1, wherein, in the cylindrical portion, the splines of the driven shaft and of the driving shaft are configured to eliminate any contact between the splines.

6. The turbomachine as claimed in claim 1, wherein the cylindrical portion has a radius that is less than a radius of said driven spline portion.

7. The turbomachine as claimed in claim 1, wherein the cylindrical portion, defines drilled holes.

8. The turbomachine as claimed in claim 1, wherein the length of the cylindrical portion is approximately 15 to 30% of the total length of that the driven spline portion.

9. The turbomachine of claim 1, comprising a compressor with said driven shaft, and further comprising a turbine with said driving shaft.

10. The turbomachine as claimed in claim 1, wherein the cylindrical portion has a thickness that is less than a thickness of said driven spline portion.

11. The turbomachine as claimed in claim 1, wherein said splines of said driving and driven shafts are uniformly distributed around a longitudinal axis of said turbomachine.

12. The turbomachine as claimed in claim 11, wherein said cylindrical portion is free of spline and extends around the longitudinal axis of said turbomachine.

13. The turbomachine as claimed in claim 12, wherein said cylindrical portion defines holes aligned in a row that extends around the longitudinal axis of said turbomachine.

14. The turbomachine as claimed in claim 12, wherein said cylindrical portion defines holes aligned in two parallel rows that extend around the longitudinal axis of said turbomachine.

* * * * *